United States Patent
Abraham et al.

(10) Patent No.: US 9,665,631 B2
(45) Date of Patent: May 30, 2017

(54) PRE-PROCESSING OF GEO-SPATIAL SENSOR DATA

(71) Applicants: Torsten Abraham, Heidelberg (DE); Florian Foebel, Buerstadt (DE); Boris Gruschko, Ziegelhausen (DE); Gerrit Simon Kazmaier, Heidelberg (DE); Christian Lahmer, Heidelberg (DE); Nico Licht, Heidelberg (DE); Marcus Lieberenz, Mannheim (DE); Lars Volker, Karlsruhe (DE)

(72) Inventors: Torsten Abraham, Heidelberg (DE); Florian Foebel, Buerstadt (DE); Boris Gruschko, Ziegelhausen (DE); Gerrit Simon Kazmaier, Heidelberg (DE); Christian Lahmer, Heidelberg (DE); Nico Licht, Heidelberg (DE); Marcus Lieberenz, Mannheim (DE); Lars Volker, Karlsruhe (DE)

(73) Assignee: SAP SE, Walldorf (DE)

( * ) Notice: Subject to any disclaimer, the term of this patent is extended or adjusted under 35 U.S.C. 154(b) by 204 days.

(21) Appl. No.: 14/219,915

(22) Filed: Mar. 19, 2014

(65) Prior Publication Data
US 2015/0268929 A1 Sep. 24, 2015

(51) Int. Cl.
G06F 17/30 (2006.01)

(52) U.S. Cl.
CPC .............................. *G06F 17/30557* (2013.01)

(58) Field of Classification Search
CPC combination set(s) only.
See application file for complete search history.

(56) References Cited

U.S. PATENT DOCUMENTS

| | | | |
|---|---|---|---|
| 7,052,391 B1 | 5/2006 | Luciano, Jr. | |
| 2003/0054905 A1 | 3/2003 | King | |
| 2010/0030350 A1 | 2/2010 | House et al. | |
| 2013/0046559 A1* | 2/2013 | Coleman | G06Q 40/08 705/4 |
| 2013/0128022 A1* | 5/2013 | Bose | H04N 7/18 348/77 |
| 2014/0019119 A1* | 1/2014 | Liu | G06F 17/21 704/9 |
| 2014/0100900 A1* | 4/2014 | Abhyanker | H04L 67/18 705/5 |
| 2015/0178972 A1* | 6/2015 | Barcay | G06T 17/05 345/419 |
| 2015/0265876 A1 | 9/2015 | Abraham et al. | |

* cited by examiner

*Primary Examiner* — Shyue Jiunn Hwa
(74) *Attorney, Agent, or Firm* — Mintz Levin Cohn Ferris Glovsky and Popeo, P.C.

(57) ABSTRACT

Data is received that is derived from a plurality of geo-spatial sensors that respectively generate data characterizing a plurality of sources within a zone of interest. The data includes series time-stamped frames for each of the sensors and at least one of the sources has two or more associated sensors. The received data can be sorted and processed, for each sensor on a sensor-by-sensor basis, using a sliding window. The sorted and processed data can then be correlated and written into a data storage application. Related apparatus, systems, techniques and articles are also described.

14 Claims, 4 Drawing Sheets

PRE-PROCESSING OF GEO-SPATIAL SENSOR DATA

TECHNICAL FIELD

The subject matter described herein relates to processing of geo-spatial data derived from a plurality of sensors for use in a real-time analytics platform.

BACKGROUND

Sensor arrays are increasingly being used to characterize motion and position of objects within a zone of interest. These sensors can include one or more of accelerometers, gyroscopes, magnetic sensors, pressure sensors, GPS, and the like to characterize position and/or relative motion of an object to which the sensor is affixed. In addition, these sensors are increasingly compact in size, low power, and transmit data wirelessly, which collectively allow the sensors to be used in a wide variety of applications including athletics.

SUMMARY

In one aspect, data is received that is derived from a plurality of geo-spatial sensors that respectively generate data characterizing a plurality of sources within a zone of interest. The data includes series time-stamped frames for each of the sensors and at least one of the sources has two or more associated sensors. The received data can be sorted and processed, for each sensor on a sensor-by-sensor basis, using a sliding window. The sorted and processed data can then be correlated and written into a data storage application.

The sorting and processing can include filtering frames based on their respective timestamps. This filtering can include recording, for each sensor, a system time and a time of a first recorded time-stamped frame, determining an expected timestamp for arriving frames, and discarding frames having a timestamp outside a pre-defined time window relative to the expected timestamp.

The sorting and processing can include subdividing a time bar into buckets according to a given sample rate, assigning each filtered frame into a corresponding bucket, and interpolating missing values if an amount of time between two valid sensor values span multiple buckets. The interpolating can, for example, be linear. Data in each bucket can be assigned to a source by transposition using a mapping table.

The sorted and correlated data can be fed into a pre-processing library prior to writing the data into the data storage application. The data storage application can be an in-memory database. The in-memory database can store data in a columnwise fashion.

Non-transitory computer program products (i.e., physically embodied computer program products) are also described that store instructions, which when executed on one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter enables data derived from geo-spatial sensors to be efficiently processed and analyzed using a real-time analytics platform such as the SAP HANA platform.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
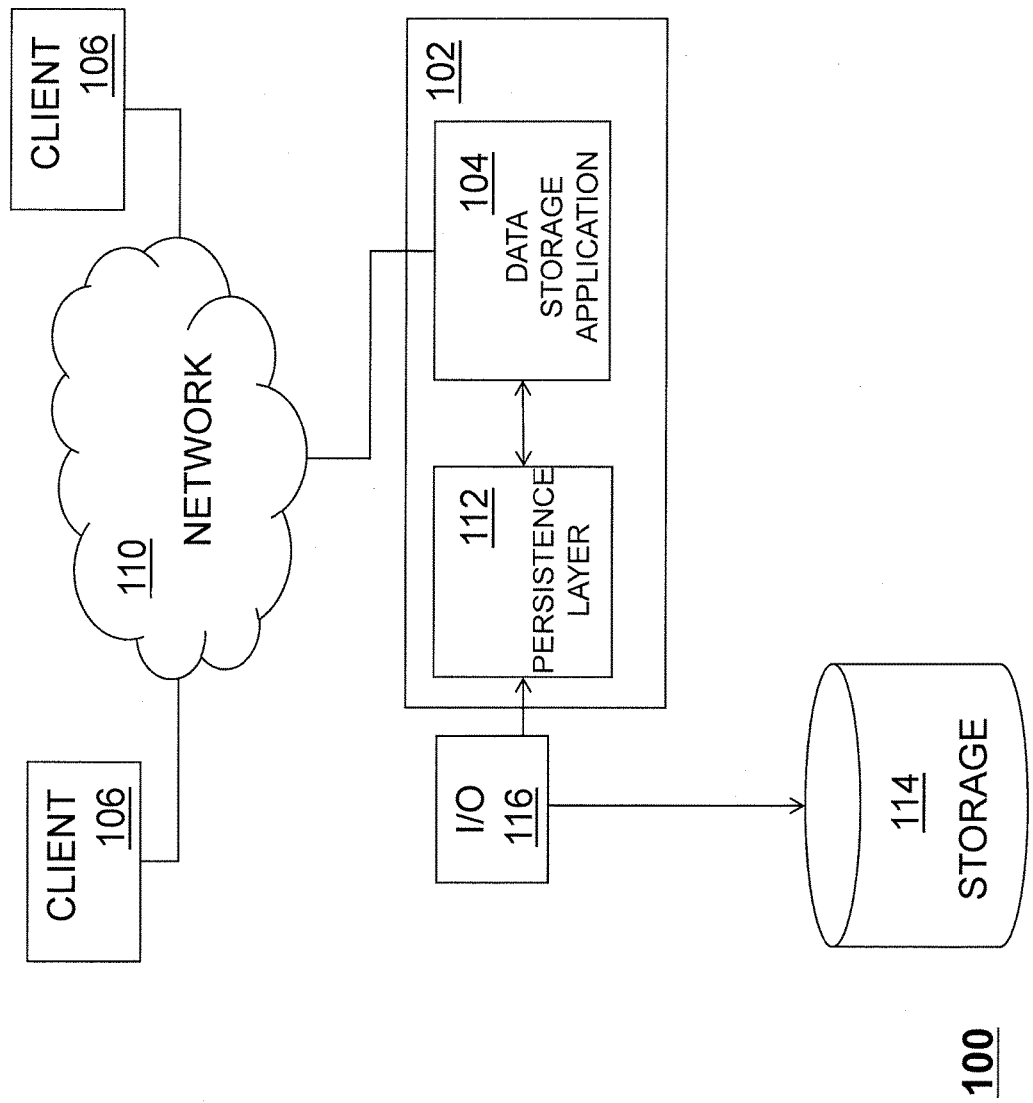
FIG. 1 is a diagram illustrating a system including a data storage application.
Figure 2:
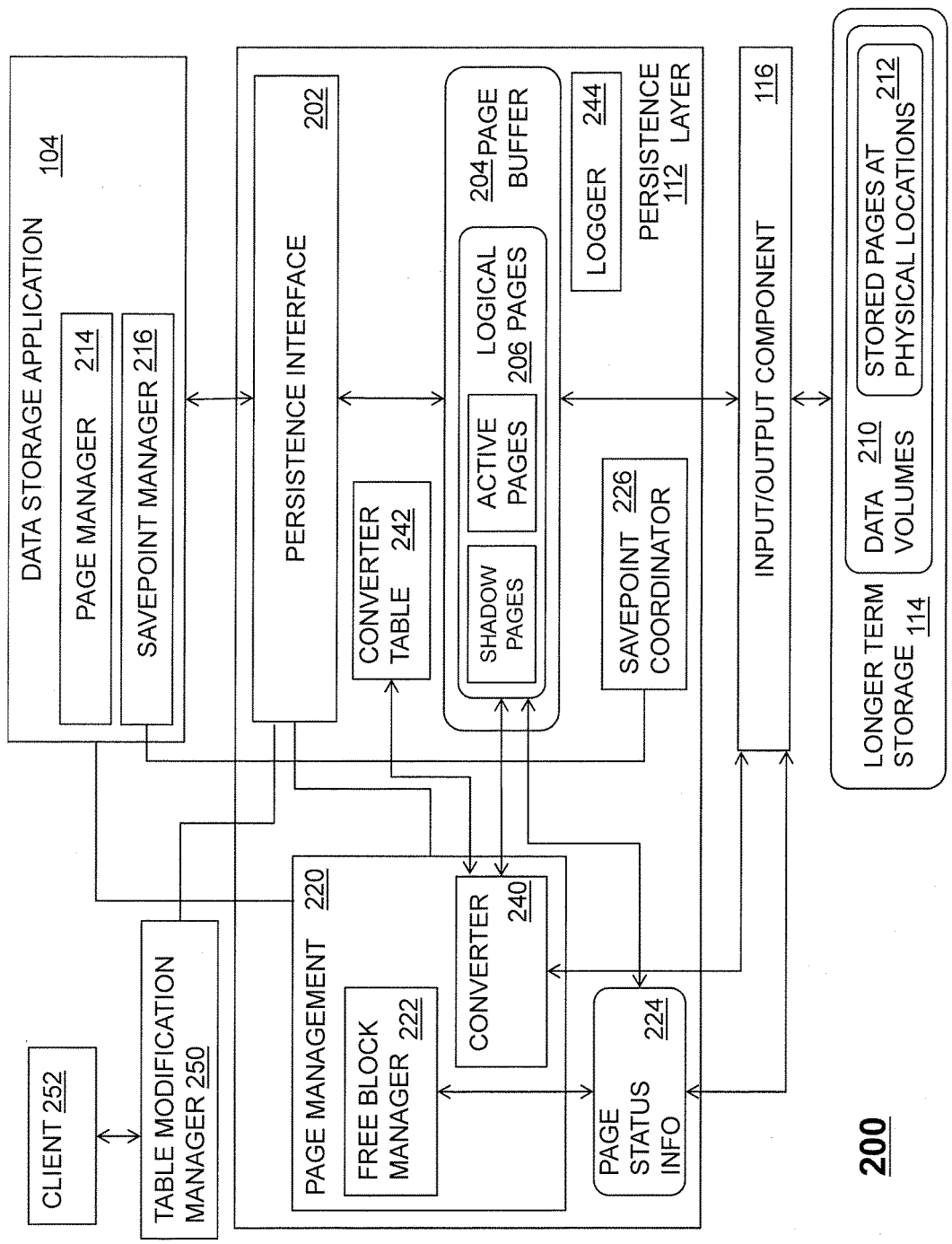
FIG. 2 is a diagram illustrating details of the system of FIG. 1.

FIGS. 1 and 2 are diagrams providing an example environment for implementing the subject matter described herein. It will be appreciated that other environments can be utilized including variations of the environments illustrated in FIGS. 1 and 2. In particular, FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

FIG. 2 shows a software architecture 200 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 202. A page buffer 204 within the persistence layer 112 can store one or more logical pages 206, and optionally can include shadow pages, active pages, and the like. The logical pages 206 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 210 where stored pages 212 are allocated at physical memory blocks.

In some implementations, the data storage application 104 can include or be otherwise in communication with a page manager 214 and/or a savepoint manager 216. The page manager 214 can communicate with a page management module 220 at the persistence layer 112 that can include a free block manager 222 that monitors page status information 224, for example the status of physical pages within the storage 114 and logical pages in the persistence layer 112 (and optionally in the page buffer 204). The savepoint manager 216 can communicate with a savepoint coordinator 226 at the persistence layer 204 to handle savepoints, which are used to create a consistent persistent state of the database for restart after a possible crash.

In some implementations of a data storage application 104, the page management module of the persistence layer 112 can implement a shadow paging. The free block manager 222 within the page management module 220 can maintain the status of physical pages. The page buffer 204 can included a fixed page status buffer that operates as discussed herein. A converter component 240, which can be part of or in communication with the page management module 220, can be responsible for mapping between logical and physical pages written to the storage 114. The converter 240 can maintain the current mapping of logical pages to the corresponding physical pages in a converter table 242. The converter 240 can maintain a current mapping of logical pages 206 to the corresponding physical pages in one or more converter tables 242. When a logical page 206 is read from storage 114, the storage page to be loaded can be looked up from the one or more converter tables 242 using the converter 240. When a logical page is written to storage 114 the first time after a savepoint, a new free physical page is assigned to the logical page. The free block manager 222 marks the new physical page as "used" and the new mapping is stored in the one or more converter tables 242.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component 244 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 244 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 112 can use a combination of undo log entries (from one or more logs) and shadow paging.

The persistence interface 202 can handle read and write requests of stores (e.g., in-memory stores, etc.). The persistence interface 202 can also provide write methods for writing data both with logging and without logging. If the logged write operations are used, the persistence interface 202 invokes the logger 244. In addition, the logger 244 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 244. For an entry of type "update", for example, this would be the identification of the affected record and the after image of the modified data.

When the data application 104 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 244 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 244 can write a database log (or simply referred to herein as a "log") sequentially into a memory buffer in natural order (e.g., sequential order, etc.). If several physical hard disks/storage devices are used to store log data, several log partitions can be defined. Thereafter, the logger 244 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 104 can use shadow paging so that the savepoint manager 216 can write a transactionally-consistent savepoint. With such an arrangement, a data backup comprises a copy of all data pages contained in a particular savepoint, which was done as the first step of the data backup process. The current subject matter can be also applied to other types of data page storage.

The data storage application 104 can utilize multi-version concurrent control (MVCC) for transaction isolation and consistent reading. Each row of the database can be associated with a unique, monotonically-increasing identifier (RowID). When a new version of the record is created, this new version can also become a new RowID (i.e., due to MVCC semantics, old versions must be kept for parallel readers and will be cleaned only during garbage collection after commit).

References herein to pages can refer to pages of a table stored in memory of an in-memory database forming part of the data storage application 104. With the MVCC-based database table implementation, all internal transient data objects of a table can be versioned. These data objects can include table a header object, metadata object(s), other internal state(s) such as vector of loaded pages, dictionary hashes/trees for compressed columnar tables, and the like. In addition, all table control structures used by readers can be versioned. These structures include, for example, page lists, value indirection vectors, internal metadata, and more. Readers do not acquire any locks on data structure, but rather, work with a current version of a data structure until query or query plan operator ends. With this arrangement, old versions only remain for a short period of time (e.g., sub-seconds). As versioned objects are typically small, memory overhead is also small. In addition, even with OLTP systems, incompatible changes are rare (i.e., there are not many concurrent versions, etc.). Moreover, with some implementations, if older versions of prioritized/big objects (e.g., main part of a columnar table, etc.) still exist, no new version of the corresponding object can be created. For example, if there is a reader doing a scan on the main part of a columnar table, which started during columnar table merge from version n−1 to version n, this scan uses main part in version n−1. Even after merge to version n is finished, further merge from version n to version n+1 will be prevented as long as there are any scans running on main part in version n−1 (as this might increase memory demand prohibitively).

Figure 3:
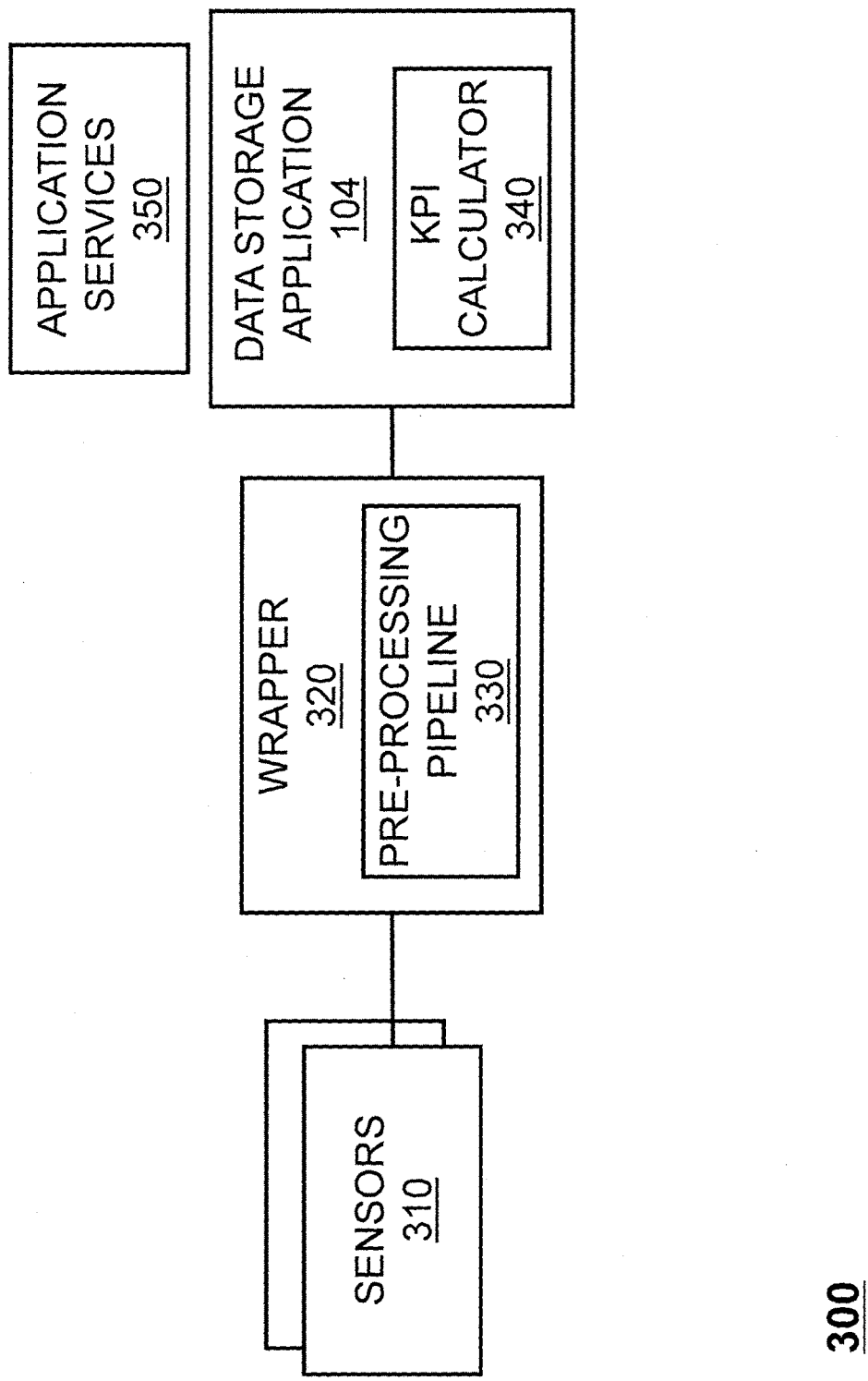
FIG. 3 is a diagram illustrating a sensor pre-processing pipeline.

With reference to diagram 300 of FIG. 3, data derived from a plurality of sensors 310 can be fed, via a wrapper 320 (e.g., a PYTHON wrapper) into a pre-processing pipeline module 330. The pre-processing module 340 can process the data in such a fashion so that it can be written and used by the data storage application 104. Once the data is made compatible/usable by the data storage application 104, various analytics can be executed using a key performance indicator (KPI) module 340. The KPI module 340 can be accessed for real-time analytics via an application services server 350. The data storage application 104 can be the SAP HANA real-time data platform and the application services server 350 can, for example, execute SAP HANA Extended Application Services (XS).

Figure 4:
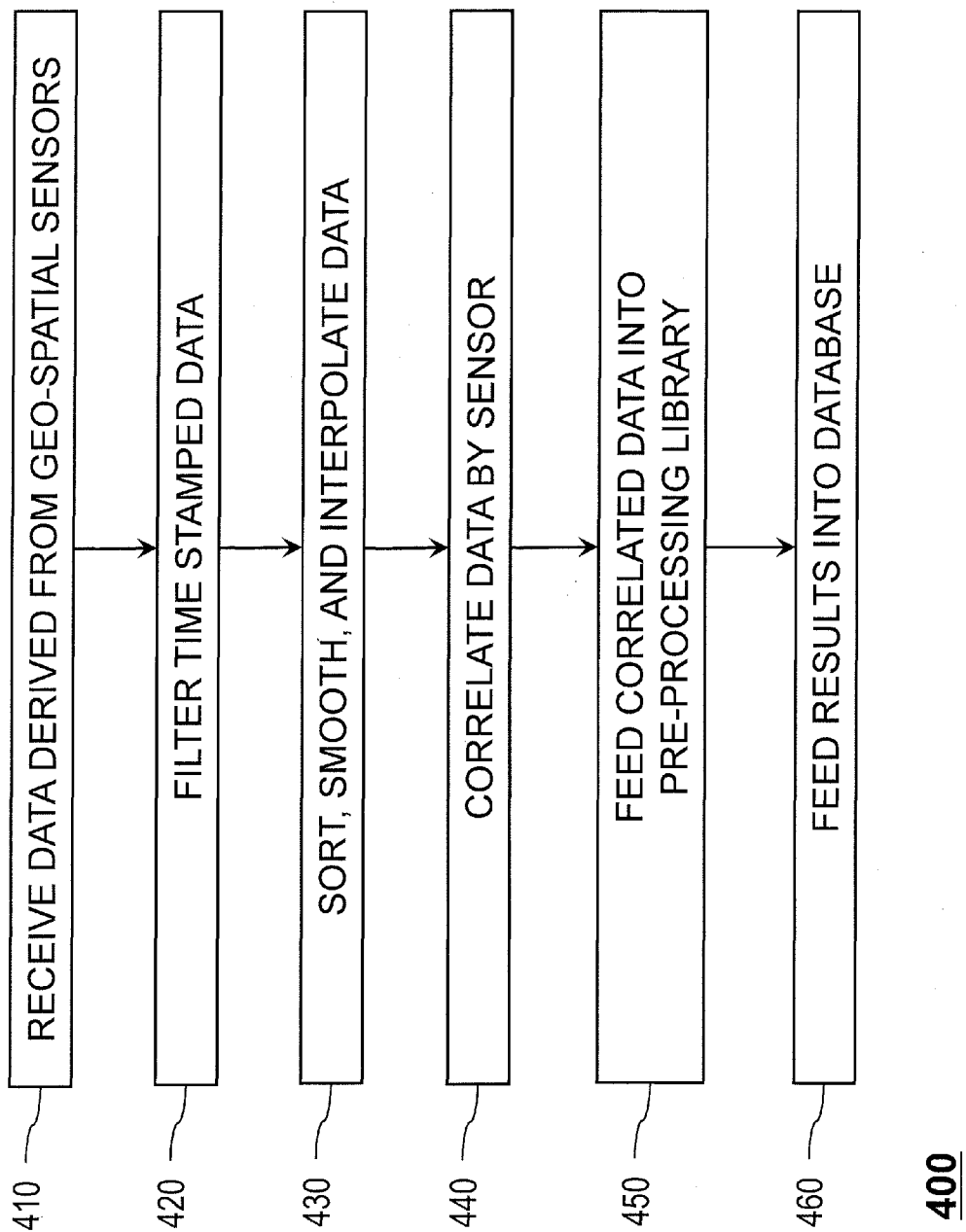
FIG. 4 is a first process flow diagram illustrating pre-processing of geo-spatial sensor data for use by a data storage application.

With reference to process flow diagram 400 of FIG. 4, data is received, at 410, that is derived from a plurality of geo-spatial sensors that respectively generate data characterizing a plurality of sources (e.g., athletes, etc.) within a zone of interest (e.g., playing field boundaries, etc.). The data comprises series time-stamped frames for each of the sensors with at least one of the sources having two or more associated sensors. Thereafter, at 420, frames having time stamps from the future (as defined below) are filtered. In order to effect such filtering, a system time as well as a time of a first sample for a particular sensor are recorded so that an expected value for a timestamp for arriving frames for the sensor can be computed. Samples having timestamps outside a pre-defined time window (e.g., 5 seconds before or after) relative to the expected value can be discarded.

After the filtering, at 430, data from each sensor can be sorted, smoothed, and interpolated using a sliding window. In particular, a time bar can be subdivided into buckets according to a given sample rate (i.e., the rate at which measurements are generated by/received from the sensors). Each filtered sample can then be assigned to its corresponding bucket. If an amount of time between two valid sensor values spans multiple buckets, missing values can be interpolated (e.g., interpolated linearly). For each bucket with minimal time, time window averages are computed for each bucket for each sensor. Such buckets are referred to herein as "render buckets."

Data from multiple sensors that are associated with a single source can also, at 440, be correlated. For example, with the example of athletics related sensors, a player can have multiple sensors attached to him/her such as at their center body and one or more sensors on each limb. The smoothed and interpolated sensor data for the render bucket can be assigned to a source entity using a mapping provided by the data storage application 104. This mapping can be stored in a table that identified which sensor was active during a training/recording, to which source/object (e.g. player) the sensor was attached and to which limb the sensor was attached. This latter process is sometimes referred to herein as "transposition."

Data can then, at 450, be fed into a pre-processing library and processed. In one implementation, a shared library written in C++ can be used to perform pre-processing. Data can be fed from the synchronization and transposition stage into the library via a Python wrapper. The library can be used to compute various KPIs (e.g. distance, ball contacts) to characterize the actions of the athletes and/or other objects within the zone of interest. Finally, at 460, the results can be written into the data storage application 104.

Before data can be added to the pre-processing library, all objects have to be added. In this regard, objects refer to any physical object or boundary within the zone of interest such as players, balls and beacons marking the playing field boundaries and goals. The beacons (also sometimes referred to as cones or pins) can also be used to mark training objects (e.g., obstacles that the players have to run around, etc).

Field boundaries and goal lines can be added as moving objects of type PIN or as fixed geometries. Data can be fed into the pre-processor via a C shared library interface. For each frame, samples for all objects are added, and then processing of that frame can be triggered. Such an arrangement can enable contextual analysis of game play by characterizing the training environment in which the objects move. This training environment includes the field boundaries and the goal post positions. The playing area is typically a rectangle but could also be an arbitrary polygon. The goals can be denoted by two points (one for each post), and in some cases, an elevation point can be denoted (corresponding to the height of the goal).

There can be two ways of specifying field outlines and goal positions to the application. A first technique is to statically configure them in a database table (called field) before analyzing a training session. The other technique is to place beacons (cones with sensors, sometimes called pins) at those positions and then configure the application to know e.g. "beacon 112 is the left upper corner of the field" or "beacon 114 is the left goal post of the left goal"). This arrangement allows for the field to dynamically change during the training (e.g. when a player accidentally stumbles over a field delimiting beacon and changes its position, etc.).

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:
1. A computer-implemented method comprising:
receiving data derived from a plurality of geo-spatial sensors that respectively generate information characterizing a plurality of sources within a zone of interest, the received data comprising a series of time-stamped frames for each of the plurality of geo-spatial sensors, at least one of the plurality of sources having two or more associated sensors of the plurality of geo-spatial sensors;
sorting and processing, for each of the plurality of geo-spatial sensors on a sensor-by-sensor basis, the received data using a sliding window, wherein the sorting and processing comprises filtering the series of time-stamped frames based on timestamps associated with each frame, the filtering of the series of time-stamped frames comprising:
 recording, for each of the plurality of geo-spatial sensors, a system time and a time of a first recorded time-stamped frame,
 determining an expected timestamp for arriving frames, and
 discarding any arriving frames having a timestamp outside a pre-defined time window relative to the expected timestamp;
interpolating a missing timestamp based on a linear interpolation between a plurality of other timestamps;

correlating the sorted and processed data for each of the plurality of sources; and
writing the correlated data into a data storage application.

2. The method as in claim 1, wherein the sorting and processing comprises:
subdividing a time bar into a plurality of buckets according to a given sample rate;
assigning each of the series of time-stamped frames based on time into a corresponding bucket of the plurality of buckets; and
interpolating missing values when an amount of time between two assigned time-stamped frames spans multiple buckets.

3. The method as in claim 1, wherein correlating the sorted and processed data for each of the plurality of sources comprises:
assigning the time-stamped frames in each of the plurality of buckets to an originating source from the plurality of sources by transposition using a mapping table.

4. The method as in claim 1 further comprising:
feeding the sorted and processed data into a pre-processing library prior to writing the data into the data storage application.

5. The method as in claim 1, wherein the data storage application comprises an in-memory database.

6. The method as in claim 5, wherein the in-memory database stores data in a columnwise fashion.

7. The method as in claim 1, wherein the receiving, sorting and processing, correlating, and writing are implemented by at least one data processor forming part of at least one computing system.

8. A non-transitory computer program product storing instructions which, when executed by at least one data processor forming part of at least one computing system, result in operations comprising:
receiving data derived from a plurality of geo-spatial sensors that respectively generate information characterizing a plurality of sources within a zone of interest, the received data comprising a series of time-stamped frames for each of the plurality of geo-spatial sensors, at least one of the plurality of sources having two or more associated sensors of the plurality of geo-spatial sensors;
sorting and processing, for each of the plurality of geo-spatial sensors on a sensor-by-sensor basis, the received data using a sliding window, wherein the sorting and processing comprises filtering the series of time-stamped frames based on timestamps associated with each frame, the filtering of the series of time-stamped frames comprising:
recording, for each of the plurality of geo-spatial sensors, a system time and a time of a first recorded time-stamped frame,
determining an expected timestamp for arriving frames, and
discarding any arriving frames having a timestamp outside a pre-defined time window relative to the expected timestamp;
interpolating a missing timestamp based on a linear interpolation between a plurality of other timestamps;
correlating the sorted and processed data for each of the plurality of sources; and
writing the correlated data into a data storage application.

9. The computer program product as in claim 8, wherein the sorting and processing comprises:
subdividing a time bar into a plurality of buckets according to a given sample rate;
assigning each of the series of time-stamped frames based on time into a corresponding bucket of the plurality of buckets; and
interpolating missing values when an amount of time between two assigned time-stamped frames span multiple buckets.

10. The computer program product as in claim 8, wherein correlating the sorted and processed data for each of the plurality of sources comprises:
assigning the time-stamped frames in each of the plurality of buckets to an originating source from the plurality of sources by transposition using a mapping table.

11. The computer program product as in claim 8, wherein the operations further comprise:
feeding the sorted and processed data into a pre-processing library prior to writing the data into the data storage application.

12. The computer program product as in claim 8, wherein the data storage application comprises an in-memory database.

13. The computer program product as in claim 12, wherein the in-memory database stores data in a columnwise fashion.

14. A system comprising:
an in-memory database;
at least one data processor; and
memory storing instructions which, when executed by the at least one data processor, result in operations comprising:
receiving data derived from a plurality of geo-spatial sensors that respectively generate information characterizing a plurality of sources within a zone of interest, the received data comprising a series of time-stamped frames for each of the plurality of geo-spatial sensors, at least one of the plurality of sources having two or more associated sensors of the plurality of geo-spatial sensors;
sorting and processing, for each of the plurality of geo-spatial sensors on a sensor-by-sensor basis, the received data using a sliding window, wherein the sorting and processing comprises filtering the series of time-stamped frames based on timestamps associated with each frame, the filtering of the series of time-stamped frames comprising:
recording, for each of the plurality of geo-spatial sensors, a system time and a time of a first recorded time-stamped frame,
determining an expected timestamp for arriving frames, and
discarding any arriving frames having a timestamp outside a pre-defined time window relative to the expected timestamp;
interpolating a missing timestamp based on a linear interpolation between a plurality of other timestamps;
correlating the sorted and processed data for each of the plurality of sources; and
writing the correlated data into the in-memory database.

* * * * *